No. 814,132. PATENTED MAR. 6, 1906.
H. S. HELE-SHAW.
CLUTCH MECHANISM.
APPLICATION FILED DEC. 16, 1903.
8 SHEETS—SHEET 1.
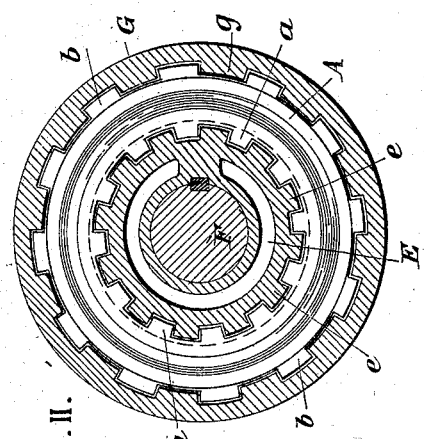
Fig. II.
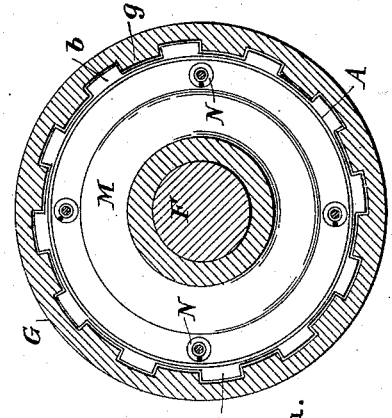
Fig. IIa.
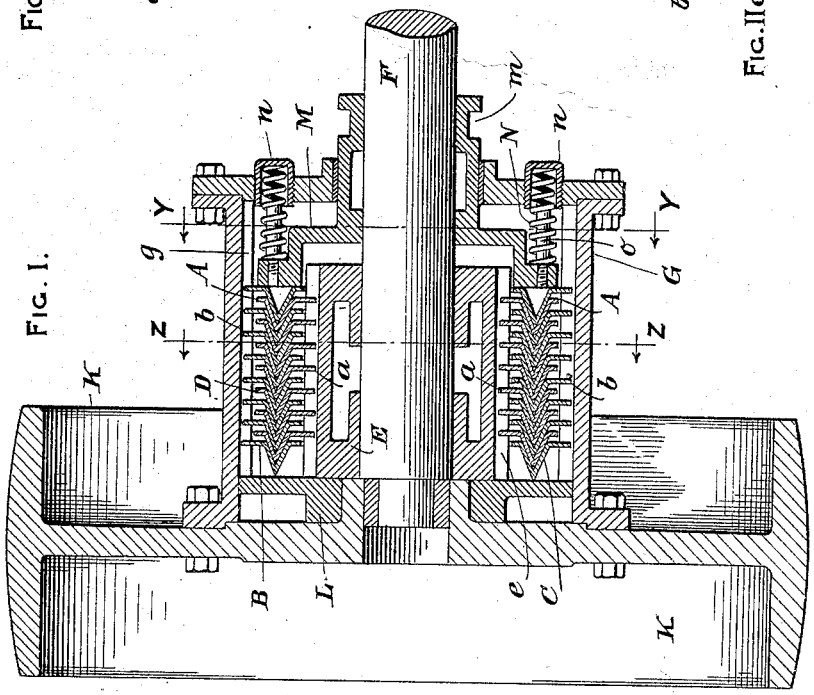
Fig. I.
Attest
O. J. Middleton
Edward Sarton
Inventor
Henry S. Hele-Shaw
by Ellis Spear Company
Attys No. 814,132. PATENTED MAR. 6, 1906.
H. S. HELE-SHAW.
CLUTCH MECHANISM.
APPLICATION FILED DEC. 16, 1903.
8 SHEETS—SHEET 2.
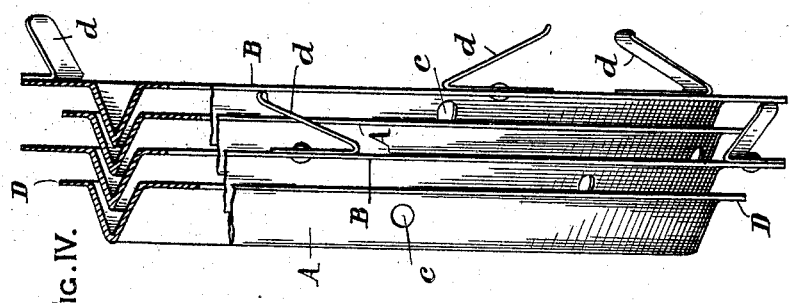
Fig. IV.
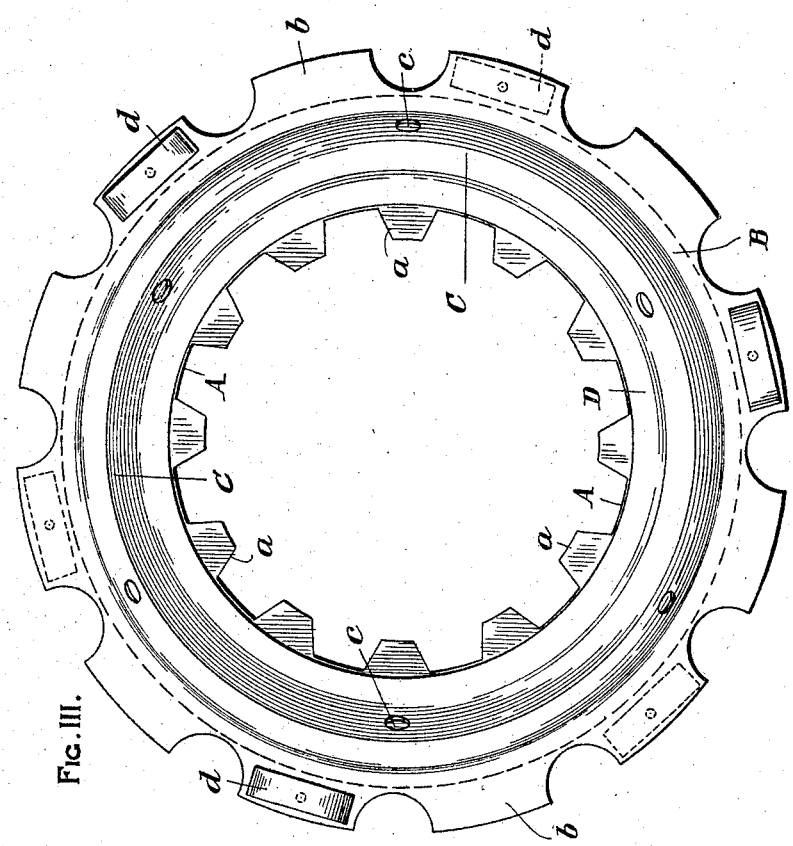
Fig. III.
Attest:
O. Middleton
Edward Saxton
Inventor:
Henry S. Hele-Shaw
by Spear Company
Attys No. 814,132. PATENTED MAR. 6, 1906.
H. S. HELE-SHAW.
CLUTCH MECHANISM.
APPLICATION FILED DEC. 16, 1903.
8 SHEETS—SHEET 3.
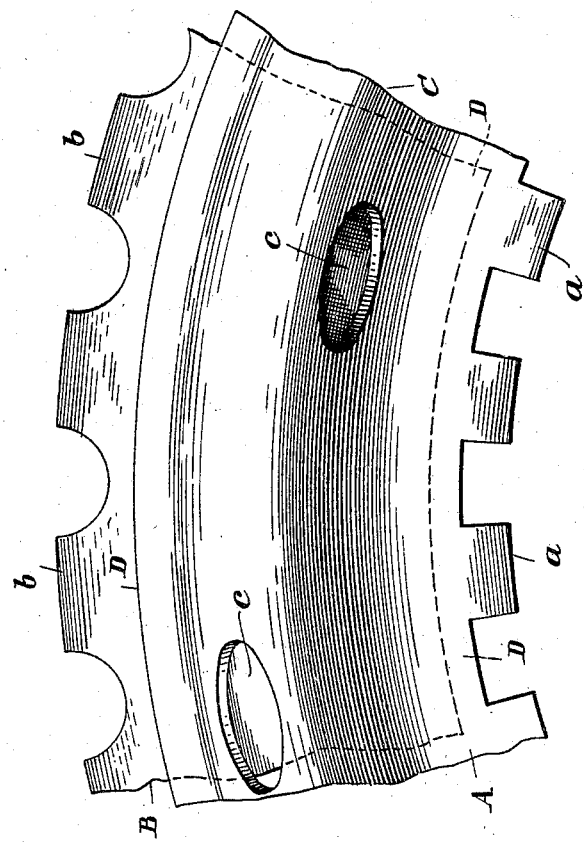
Fig. VI.
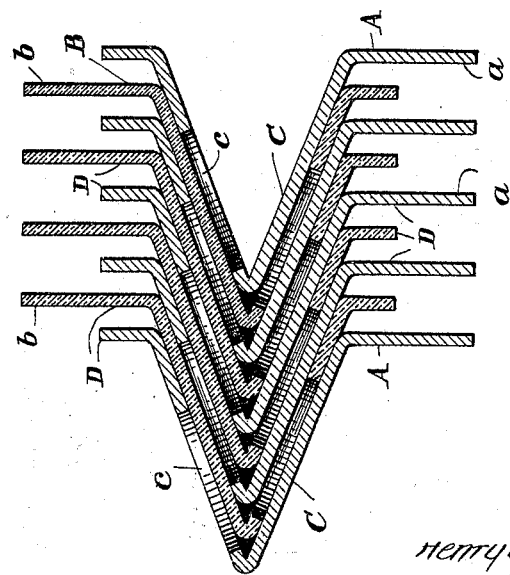
Fig. V.
attest:
Edward Sarton
Inventor:
Henry S. Hele-Shaw.
by
Att'ys No. 814,132. PATENTED MAR. 6, 1906.
H. S. HELE-SHAW.
CLUTCH MECHANISM.
APPLICATION FILED DEC. 16, 1903.
8 SHEETS—SHEET 4.
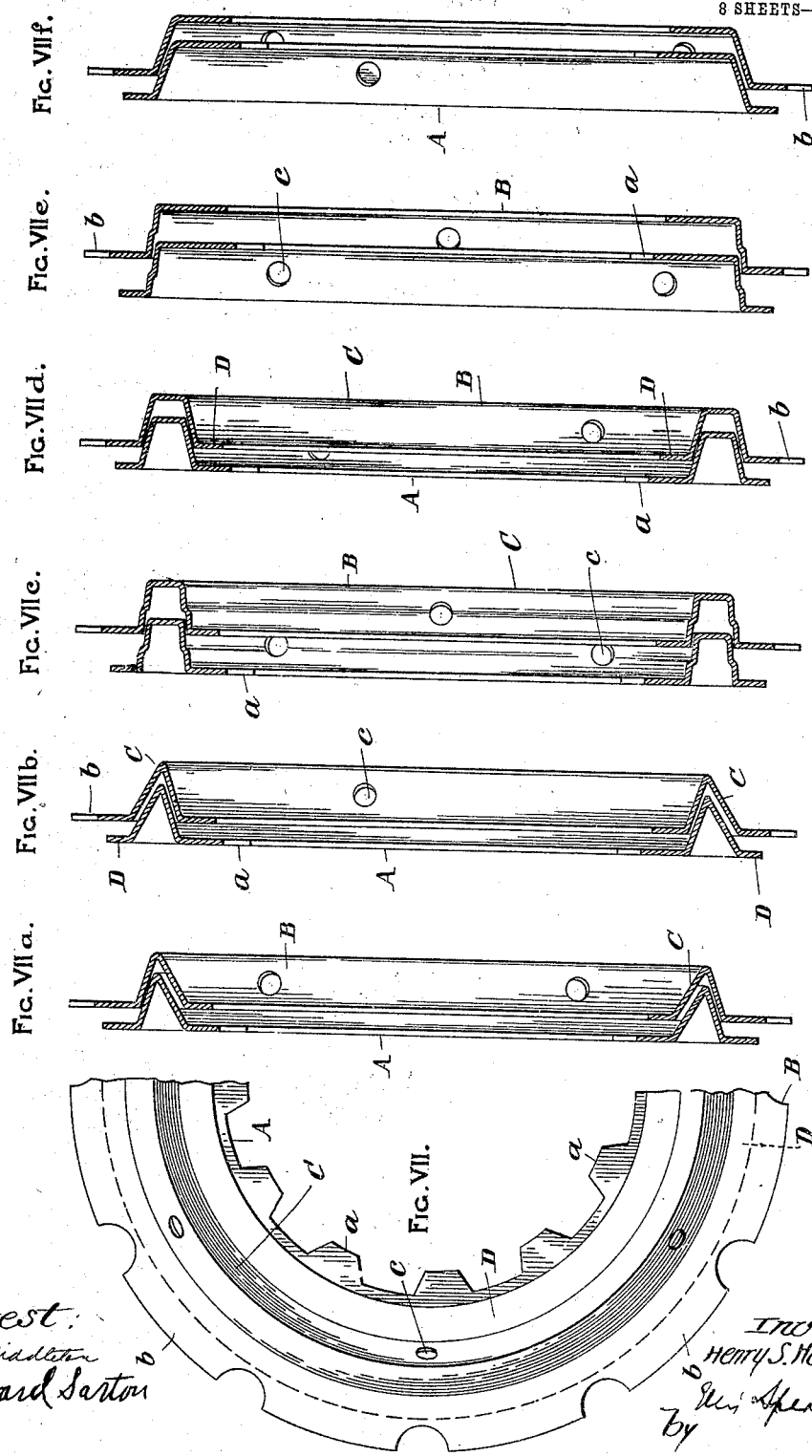

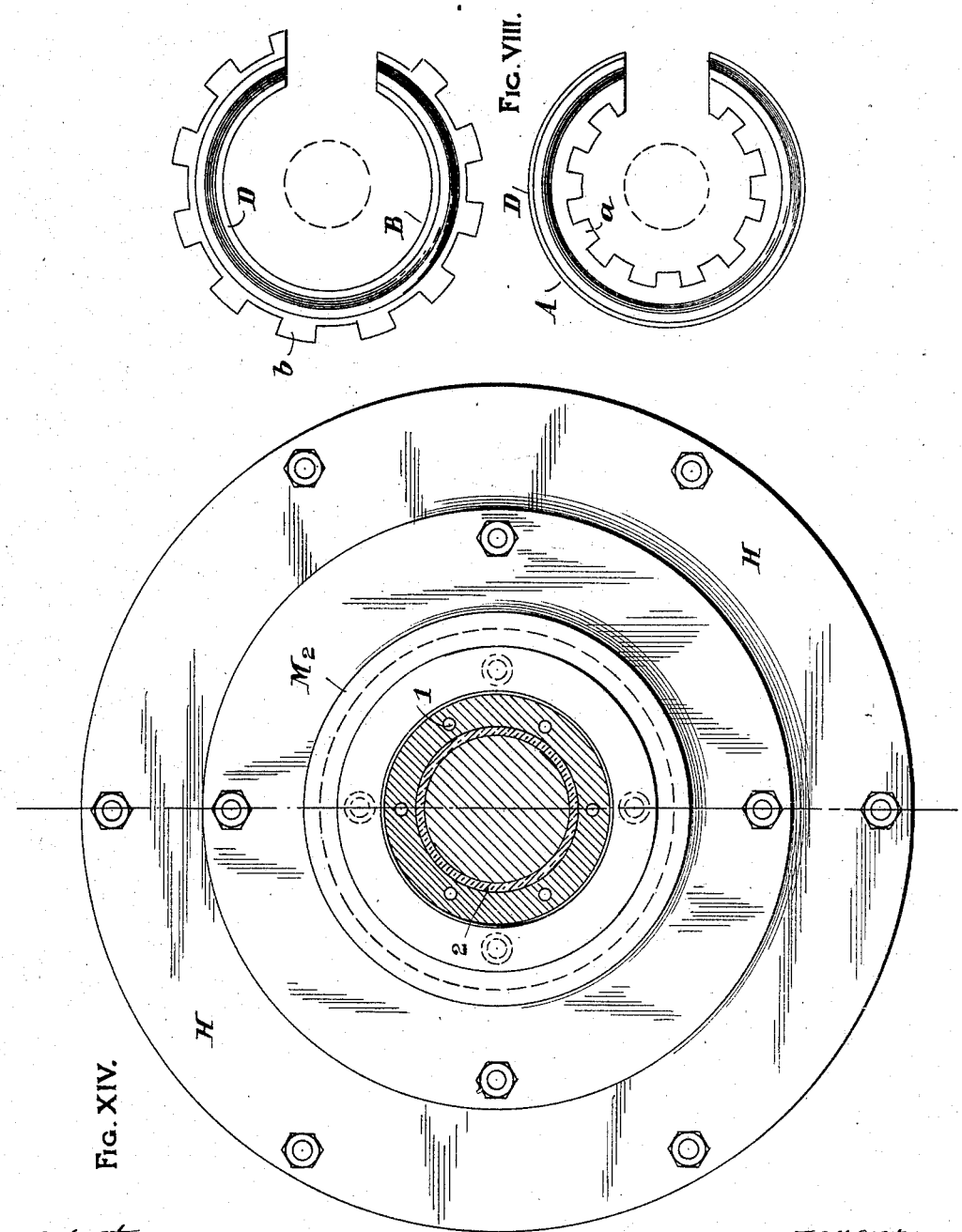

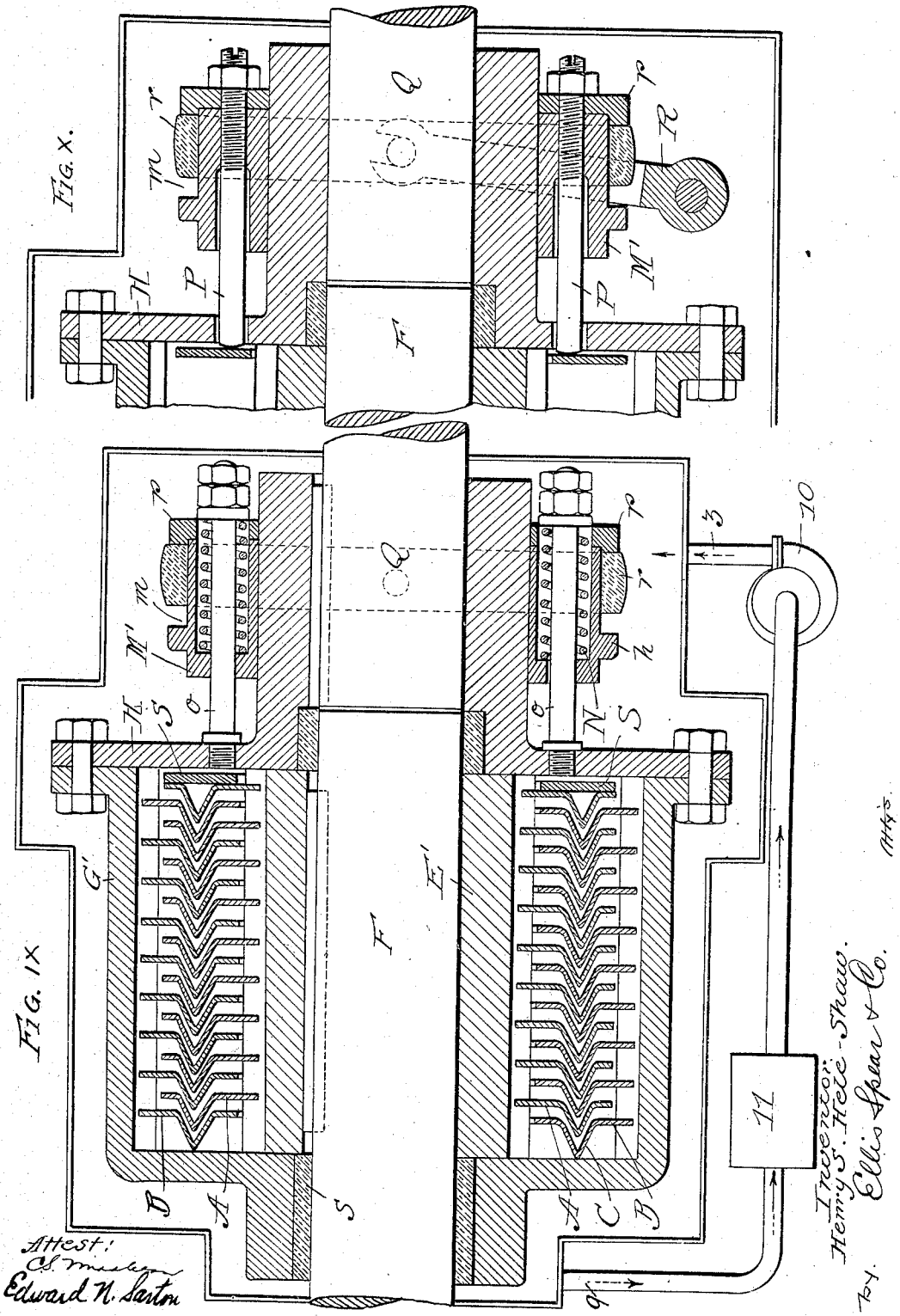

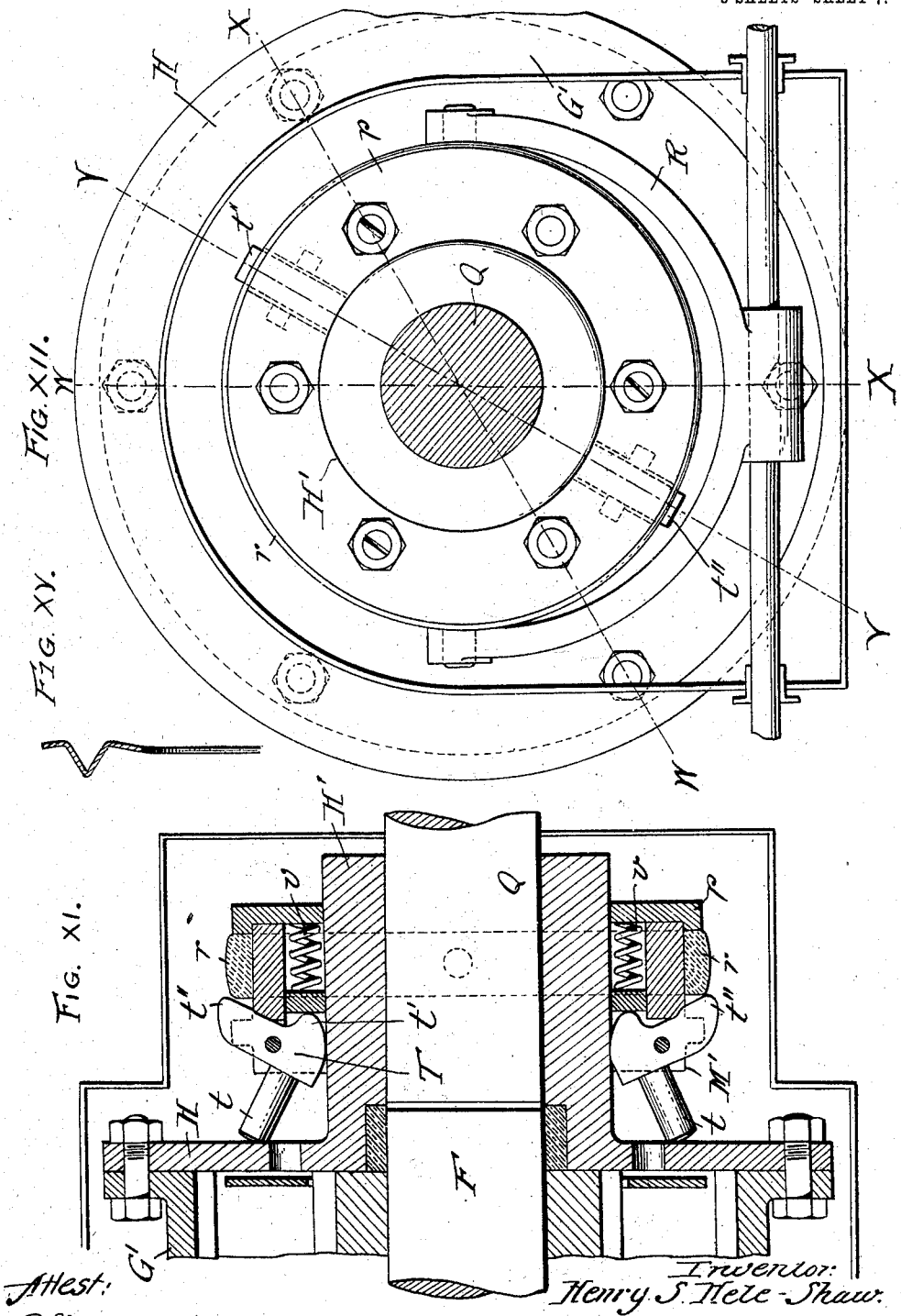

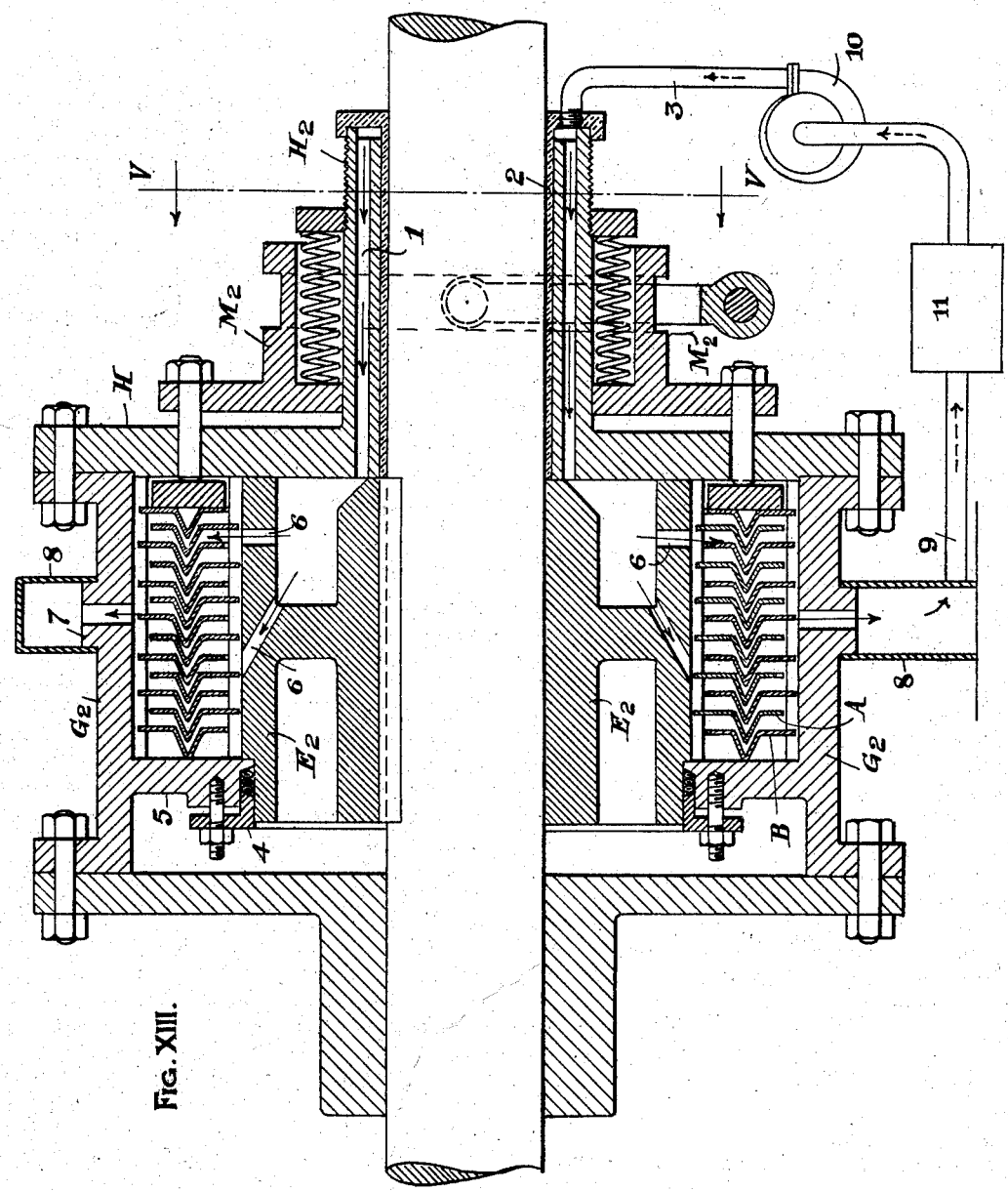
Fig. XIII.

UNITED STATES PATENT OFFICE.

HENRY SELBY HELE-SHAW, OF LIVERPOOL, ENGLAND.

CLUTCH MECHANISM.

No. 814,132.            Specification of Letters Patent.            Patented March 6, 1906.

Application filed December 16, 1903. Serial No. 185,444.

*To all whom it may concern:*

Be it known that I, HENRY SELBY HELE-SHAW, a subject of the King of Great Britain, residing in Liverpool, in the county of Lancaster, England, have invented certain new and useful Improvements in Clutch Mechanism, of which the following is a specification.

This invention relates to improvements in clutches, brakes, dynamometers, and the like; and the object is to provide a clutch or brake which can be used as such or in the construction of a dynamometer and in which a series of identically-shaped thin flexible metal plates are employed as the engaging surfaces.

I have illustrated my invention in the accompanying drawings, in which—

Figure I is a sectional elevation in medial section; and Figs. II and II$^a$, transverse sections on Z Z and Y Y, respectively, of Fig. I of a clutch such as would be employed to connect a driving to a driven shaft or to connect a pulley to a driving-shaft. Figs. III, IV, V, and VI are detail views of the engaging plates, Figs. III and IV being an elevation and an end view, partly in section, respectively, of a set of four such plates and Figs. V and VI enlarged fragmentary section and elevation. Figs. VII to VII$^f$ show a series of modified forms of engaging plates, Fig. VII being in elevation and Figs. VII$^a$ to VII$^f$ being in medial section. Fig. VIII shows a form of plate which is adapted to be inserted or withdrawn without having to be threaded over the shaft. Figs. IX, X, XI, and XII illustrate a clutch suitable for connecting together two lines of shafting; and Figs. XIII and XIV illustrate the arrangement for a pulley-clutch, the means in each case for circulating the lubricant being external to the clutch. Fig. XV is a detail view of a modified form of plate in which the flanges or fins extend at a slight inclination to the axis.

The engaging surfaces are composed of two sets of plates—a set A, each plate of which is connected to a part of the mechanism by the teeth $a$ on its inner periphery, and a set B, each plate of which is connected to another part of the mechanism by the teeth $b$ on its outer periphery. These plates are formed of comparatively thin metal and are characterized by the fact that in respect to the shape of the mutually-engaging surfaces they are identical. This enables me to manufacture them cheaply and expeditiously in the one set of dies by pressing, stamping, or the like process. The plates have between their edges an offset portion C extending circumferentially round the plate. The side or sides of the offset which form the frictionally-engaging surfaces are inclined to those portions of the plate on either side thereof, which latter portions form strengthening-flanges and heat-radiating fins D and will hereinafter be referred to as "fins." In a diametral section of the plate the offset is preferably V shape, and the fins are preferably normal or approximately normal to the axis of rotation, as shown in Figs. III to VI, although I find the other equivalent sections, such as those shown in Figs. VII$^a$ to VII$^f$, may be used. In each case, however, there is a central circumferential offset portion and annular fins on each side thereof. When the plates are assembled together, as shown in particular in Figs. IV and V, the sides of the offsets form the engaging surfaces, and the fins serve to strengthen the offsets against distortion and to serve, in conjunction with a lubricating and cooling fluid, as will be described more fully hereinafter, to dissipate the heat generated in the clutch when it slips under load. The plates have a series of holes $c$, through which the lubricant circulates.

I have found in practice that friction-plates with a single offset portion with strengthening and heat-radiating fins on each side are a most marked improvement on friction-plates with multiple corrugations extending practically over the whole surface. This may be explained as follows: The radius at which the frictional resistance acts is definite, and the resulting torque is found to be greater and more constant than in the multiple corrugated plates, where the mean radius is a more or less accidental factor and depends upon whether the inner or outer corrugations take the major part of the pressure. The lateral dimensions of the offset may be much greater with a single offset than with multiple corrugations, and while the single offset without the fins would not be rigid enough to resist distortion the fins provide this necessary rigidity. The heat generated by the friction is much more efficiently carried away by the radiating-fins, which provide a very large radiating-surface in proportion to the frictionally-engaging surface than is the case in plates with the multiple corrugations. The lubricating and cooling liquid is much more effective, inasmuch as its action is much more definite in the case of a single offset with lubricating-holes, and the cooling action is much assisted by the fact that the radiating-fins present a comparatively large cooling-surface to the liquid and allow of a free flow of lubricating fluid, between them, to the contact surfaces.

In some cases where it is desired to insert and withdraw the plates without having to thread them over the shaft I accomplish this by cutting away a portion of the plate, the lines along which the plate is cut being either radial or parallel to a central radial line, the latter form being preferred. The resulting plate is approximately C-shaped, as shown in Fig. VIII.

In the case of a clutch—such, for example, as illustrated in Figs. I, II, and II$^a$—the plates A are connected to a sleeve E, which is provided with a series of feather-ways $e$ to take the teeth $a$, and the sleeve E is keyed to a shaft, usually the driving-shaft F. The plates B are connected to a casing G, also provided with feather-ways $g$ to take the teeth $b$, and this casing is keyed or otherwise secured to the driven part of the mechanism, here shown as a pulley K. The plates are free to move to a limited extent axially along the feather-ways; but the movement of the last plate B in the casing is limited by the end piece L. The casing is filled, with the plates A and B arranged alternately, as shown, and the plates are pressed together by a sliding plate M. In Fig. I this plate M is under the influence of a series of springs N, located in adjustable sleeves $n$, carried in the detachable cover of the casing G, and the plate M extends through the cover of G to form a grooved part $m$, which is operated in the usual way by a pivoted forked lever. When the lever holds the plate M away from the plates in opposition to the springs, the alternate plates B are forced apart by a series of weak springs $d$, carried on the radiating fins or flanges of these plates, (see Figs. III and IV,) and the clutch runs free. When the forked lever is released, the springs N press the plates A and B together with a pressure sufficient to insure their engagement if no slipping be required or with a less pressure than this if it be desired that there should be slip with an accompanying absorption of power, as in a brake or absorption dynamometer, in which latter cases the one part of the clutch is fixed.

With plates of the kind described the resistance appears to be greater than that due to friction in the ordinary sense of the term, and it is probable that there is a further resistance due to what may be termed "distortion friction." The plates when pressed or stamped in dies are not of course of absolutely true circular configuration in the corrugations, and when, therefore, there is relative movement between them when they are pressed together there is necessarily a certain amount of distortion friction, which probably offers considerable resistance to such relative movement. If the plates are of such shape as to be exceedingly weak and easily distorted, this action would hardly be sufficient to give this result. On the other hand, if the plates are very thick it would be difficult to distort them at all. I therefore find plates of the kind described—that is, made of sheet metal—admirably adapted for the purpose, especially when each plate is provided with fins D both inside and outside the offset C, for these fins give the necessary resistance to distortion. I further find that in order to obtain the best results there should be a very intimate and efficacious lubrication, and this I provide by perforating the offsets by the holes $c$. The plates are immersed in a lubricant, and for this purpose the casing is made approximately fluid-tight and may, if necessary, be provided with means for circulating the liquid or may have suitable inlet and outlet, and the liquid may be circulated by means external to the clutch. The fins D are very effective, as mentioned, as radiators for conveying the heat away from the surfaces in contact, and it will be obvious that these fins may be inclined at an angle to the axis, (especially if such angle be nearly a right angle,) so as to form the frustum of a cone, and I claim as part of my invention the use of such fins in lieu of fins perpendicular to the axis of the plate. It will also be observed that as the holes $c$ are in the sides of the offsets the liquid can circulate from hole to hole through the clearance-space between the apices. The circulation is thus not dependent upon the coincidence of the holes as they pass each other.

In Figs. IX to XII the clutch-casing is adapted to form a lubricant-container; but in this case the springs are located outside the casing and the pressure is transmitted through presser-pins P, passing through the end of the casing. An outer fixed casing 12, making joint with the shaft, is also provided, through which a lubricant may be circulated by means of a pump 10, and which lubricant may be cooled by a refrigerator 11, the pump and refrigerator being connected with the inlet 13 and outlet 14. The clutch-casing G' is adapted to hold lubricant, but may be only approximately fluid-tight, so that when the casing G' is rotated the fluid therein may mix with the circulating fluid. As before, there are two sets of plates A and B, a sleeve E', keyed to the shaft F, and an outer casing G', which in this case is keyed to the shaft Q. On a cylindrical prolongation H' of the end H of the casing G' is mounted a sliding sleeve M', to which the adjustable presser-pins P are attached. A groove $m$ is formed by the flange $h$ and the end piece $p$, which latter is secured in place by the nuts of the presser-pins P. The presser-pins may be adjusted axially in the sleeve M' by screwing them in or out, and they are locked by the nuts shown. The sleeve is operated by the forked lever R, which engages with pins on the ring r. These parts of the apparatus will be understood on reference to Fig. X, which is a section on the plane X X of Fig. XII through the presser-pins. The springs N are carried on pins o, fixed to H, and are housed in holes formed in the sleeve M'. (See Fig. IX, which is a section on the plane W W of Fig. XII through the springs.) One end of each of the springs presses against the end of the hole in M' and the other against the adjusting-nuts on the pin o. The effect, therefore, is to press the sleeve M' toward the plates, and this pressure is transmitted by the presser-pins to the end ring S and then through the plates. Bushes s are fitted between the casing G' and the shaft to form bearings. The sleeve M' may be operated entirely by the lever R—that is to say, the sleeve M' may be held against the springs in its off position by this lever; but I prefer in this case to fit triggers T, (see Fig. XI, which is a section on the plane V V of Fig. XII through the triggers,) pivoted in slots in the sleeve. Each trigger has a cylindrical part $t$, which when the sleeve M' is pulled to its off position against the springs N is tilted by the pressure of the small springs $v$ on the heel $t'$ of the trigger, so as to engage with the end H of the casing, as shown in Fig. XI, and so hold the sleeve M' in its off position independently of the lever R. When, however, the sleeve M' is moved back by the lever R, the ring $r$ engages with the shoulder $t''$ of the trigger and rotates it until the cylindrical part $t$ enters the hole $w$ in the casing and leaves the sleeve M' free to move under the action of the springs.

In the form illustrated in Figs. XIII and XIV, I have illustrated a clutch provided with ports, inlet, outlet, &c., to permit of the circulation of the lubricant therethrough by means external to the clutch. In this case the sleeve $E^2$, casing $G^2$, and sleeve $M^2$ and the plates A and B are practically similar to those described, except that the following modifications are introduced to enable the lubricant to be circulated: The prolongation $H^2$ of the end H has a number of ports 1 formed in it, and it is mounted on a fixed sleeve 2, which serves to connect the inlet-pipe 3 to the ports 1 in the rotating part $H^2$. The end of the sleeve $E^2$ is cylindrical, and a gland 4 is fitted between it and the flange 5 of the casing $G^2$, and ports 6 are formed in $E^2$ to allow the lubricant to reach the plates. The casing $G^2$ has an external cylindrical part 7 formed on its periphery, which part 7 fits in a splash-box 8, which encircles it. Holes are formed in the part 7, and the splash-box is joined to the outlet-pipe 9. A pump 10 and, if necessary, a refrigerator 11 may be connected between the inlet 3 and the outlet 9. The lubricant follows the course indicated by the arrows. In some cases I fit a second sleeve, such as 2, connected to the outlet at the other end of the clutch, and dispense with the splash-box. Fig. XIII is in medial section, and Fig. XIV is a transverse section on the plane V V of Fig. XIII. The plate, springs, &c., are omitted from Fig. XIII.

I find it desirable to make the section-angle of the offsets as acute as possible. With the single V there is obviously a limit to the fineness of the angle, especially if holes are to be drilled or punched in the sides of the offsets, and to facilitate the formation of the holes and yet preserve the acute angle of the offset I may make the V unsymmetrical, as shown in Figs. VII$^a$ or VII$^b$, or I may obtain the same effect by making the offset in section, of trough shape, as shown in Fig. VII$^d$, or by dispensing with one side of the trough, as in Fig. VII$^f$, in which latter case the plate is of simple dish shape in section. In some cases the angle may be so acute that in consequence of the thickness of the plate the offsets may not mesh, and in such cases I step the slope of the offsets to form two parallel but laterally-displaced surfaces, as in Figs. VII$^c$ and VII$^e$. In each case the sloping side is perforated by holes $c$, and it will be seen that the shapes in Figs. VII$^a$ to VII$^f$ are admirably adapted to be drilled or even punched out.

In Figs. I, IX, and XIII the plates shown in place in the clutch are represented conventionally—that is to say, no attempt is made to show the true shape of the offset. This shape is clearly indicated in the larger scale-drawings of the plates. Neither is the thickness of the plate drawn to scale in these views, as this would be impracticable, seeing the plates are of sheet metal. As many plates are fitted as the clutch-casing will hold.

It is to be understood that the term "offset" as used in this specification is applied to mean a portion of the plate lying between the inner and outer fins, which is deflected in respect to the fins or is arranged at an angle to the said fins in order to secure a nesting of the plates one within the other, and an inclined contact surface between them when the plates are adjusted axially in relation to each other.

Having now fully described my invention, what I claim, and desire to secure by Letters Patent, is—

1. A friction-clutch comprising thin annular plates, each having a single offset portion extending circumferentially at the central part and of identical formation with the single offset of the adjacent plate, said plates having peripheral fin portions and means for holding the said plates in frictional relation, the said fin portions reaching from the extreme edge of the plate to the point where the wall of the single offset begins to project laterally from the general plane of the plate, said fin portions and single offset portions occupying the whole extent of the plate, substantially as described.

2. A friction-clutch comprising thin annular plates, having identical offset portions extending circumferentially at their central portions and having peripheral fin portions, the section of the offset being of V configuration the sides of the V being inclined at different angles to the plane of the plate, and means for holding the said plates in frictional relation, substantially as described.

3. A friction-clutch comprising thin annular plates, each having a single offset portion extending circumferentially at the central part and of identical formation with the single offset of the adjacent plate, said plates having peripheral fin portions and means for holding the said plates in frictional relation, the said fin portions reaching from the extreme edge of the plate to the point where the wall of the single offset begins to project laterally from the general plane of the plate, said fin portions and single offset portions occupying the whole extent of the plate, said plates being flexible whereby distortion friction is obtained, substantially as described.

4. A friction-clutch comprising thin annular plates, having identical offset portions extending circumferentially at their central portions and having peripheral fin portions, the section of the offset being of V configuration the sides of the V being inclined at different angles to the plane of the plate, the alternate plates being provided with springs tending to separate them, and means for holding the said plates in frictional relation, substantially as described.

5. A friction-clutch comprising thin annular plates each having a single offset portion extending circumferentially at the central portion thereof and of identical formation with the single offset of the adjacent plate, and having peripheral fin portions, said fin portions being toothed on their edges with a plain portion or belt between the said teeth and the offset portion of the plate, and means for holding the plates in frictional relation, the said toothed portion, the plain belt and the single offset occupying the whole extent of the plate, substantially as described.

6. A friction-clutch comprising thin annular plates having identical offset portions extending circumferentially at their central portions and having peripheral fin portions extending in planes perpendicular to the axis of rotation and means for holding the plates in frictional relation, substantially as described.

7. In combination, the clutch members, the friction-plates, and the means for controlling the pressure between the said plates consisting of a sliding sleeve, a forked lever and ring to operate the sleeve, presser-pins, springs adapted to transmit through the presser-pins pressure to the plates, and triggers tripped by the forked lever and ring and adapted to relieve the plates of the said spring-pressure, substantially as described.

8. A friction-clutch comprising thin annular plates having offsets extending circumferentially at their central portions and having peripheral fin portions, a portion of the annulus being cut away to form a gap, and means for holding the said plates in frictional relation, substantially as described.

9. A clutch comprising thin annular plates having offsets at their central portions and having peripheral fin portions extending at an angle to the axial line of the plates of a different degree from that existing between the walls of the offset and the axis of the plates said peripheral fin portions being separated from each other, substantially as described.

In testimony whereof I have hereunto set my hand in the presence of two subscribing witnesses.

HENRY SELBY HELE-SHAW.

Witnesses:
J. E. LLOYD BARNES,
H. WATSON.